(12) United States Patent
Lawlor

(10) Patent No.: US 6,298,653 B1
(45) Date of Patent: *Oct. 9, 2001

(54) RAMJET ENGINE FOR POWER GENERATION

(75) Inventor: Shawn P. Lawlor, Redmond, WA (US)

(73) Assignee: Ramgen Power Systems, Inc., Bellevue, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/522,058

(22) Filed: Mar. 9, 2000

Related U.S. Application Data

(62) Division of application No. 08/991,949, filed on Dec. 16, 1997.
(60) Provisional application No. 60/028,311, filed on Dec. 16, 1996.

(51) Int. Cl.$^7$ ........................................ F02C 3/14
(52) U.S. Cl. ............................................. 60/39.02
(58) Field of Search ................................ 60/39.02, 39.35

(56) References Cited

U.S. PATENT DOCUMENTS

| | | |
|---|---|---|
| 898,753 | 9/1908 | Lees et al. |
| 1,287,049 | 12/1918 | Kramer . |
| 1,945,608 | 2/1934 | Hill . |
| 2,115,338 | 4/1938 | Lysholm . |
| 2,180,168 | 11/1939 | Puffer . |
| 2,220,066 | 11/1940 | Cornell . |
| 2,243,467 | 5/1941 | Jendrassik . |
| 2,395,403 | 2/1946 | Goddard . |
| 2,402,826 | 6/1946 | Lubbock . |

(List continued on next page.)

FOREIGN PATENT DOCUMENTS

| | | |
|---|---|---|
| 554906 | 5/1932 | (DE) . |
| 3144347A1 | 8/1983 | (DE) . |

(List continued on next page.)

OTHER PUBLICATIONS

Liepmann, H.W. and Roshko, A., Elements of Gasdynamics, John Wiley & Sons, Inc., New York, 1957, p. 114–119.
Hoerner, S.F., Fluid–Dynamic Drag, Horner Fluid Dynamics, New Mexico, 1965, p. 16–35.
Shapiro, A.H., The Dynamics and Thermodynamics of Compressible Flow, John Wiley & Sons, Inc., New York, 1953, pp. 454–456; 579–580.

(List continued on next page.)

Primary Examiner—Ted Kim
(74) Attorney, Agent, or Firm—R. Reams Goodloe, Jr.

(57) ABSTRACT

A method of generating power. Ramjet structural components to provide inlet compression, a combustion chamber, and an outlet nozzle are provided at one or more circumferentially spaced locations along the periphery of a low aerodynamic drag rotor. Ramjet compression occurs by impingment of an inlet air stream between a rotating inlet structure and an adjacent stationary wall. The compressed air inlet stream provides oxygen for mixing with a fuel, such as natural gas, other suitable hydrocarbons, or hydrogen, which is supplied to the ramjet combustion chamber(s). Fuel is oxidized in the combustion chamber(s) to produce expanding combustion gases. Such gases escape out through a nozzle formed between a rotating outlet structure and a stationary wall. The ramjet operates at supersonic velocities, and preferably in excess of Mach 2.0, to produce shaft energy. The rotor rotates about an axis defined by an output shaft. The rotor acts as a structural member which transmits to the output shaft the thrust generated by the ramjets. Thermal and mechanical energy in escaping combustion gases may also be utilized to increase the overall efficiency of the ramjet engine.

17 Claims, 14 Drawing Sheets

U.S. PATENT DOCUMENTS

| | | |
|---|---|---|
| 2,410,538 | 11/1946 | Walton . |
| 2,425,904 | 8/1947 | Vernon . |
| 2,430,398 | 11/1947 | Heppner . |
| 2,444,742 | 7/1948 | Lutjen . |
| 2,446,266 | 8/1948 | Cummings . |
| 2,448,972 | 9/1948 | Gizara . |
| 2,465,856 | 3/1949 | Emigh . |
| 2,474,685 | 6/1949 | McCollum . |
| 2,481,235 | 9/1949 | Parr et al. . |
| 2,486,990 | 11/1949 | Sharpe . |
| 2,499,863 | 3/1950 | Hart . |
| 2,509,359 | 5/1950 | Margolis . |
| 2,523,655 | 9/1950 | Goddard . |
| 2,579,049 | 12/1951 | Price . |
| 2,590,109 | 3/1952 | Lindenbaum . |
| 2,592,938 | 4/1952 | McNaught . |
| 2,594,629 | 4/1952 | Exner . |
| 2,603,947 | 7/1952 | Howard . |
| 2,628,473 | 2/1953 | Frye . |
| 2,633,701 | 4/1953 | Moores . |
| 2,649,266 | 8/1953 | Darrieus . |
| 2,690,809 | 10/1954 | Kerry . |
| 2,709,889 | 6/1955 | Mount . |
| 2,709,895 | 6/1955 | Mount . |
| 2,710,067 | 6/1955 | Del Pesaro . |
| 2,850,873 | 9/1958 | Hausmann . |
| 2,895,259 | 7/1959 | Beckett . |
| 2,994,195 | 8/1961 | Carswell . |
| 3,001,364 | 9/1961 | Woodworth . |
| 3,009,319 | 11/1961 | Filpenco . |
| 3,027,118 | 3/1962 | Willox . |
| 3,118,277 | 1/1964 | Wormser . |
| 3,200,588 | 8/1965 | Math . |
| 3,299,961 | 1/1967 | Coplin et al. . |
| 3,321,911 | 5/1967 | Myles . |
| 3,371,718 | 3/1968 | Bacon . |
| 3,541,787 | 11/1970 | Romoli . |
| 3,543,520 | 12/1970 | Kelley et al. . |
| 3,557,551 | 1/1971 | Campbell . |
| 3,680,308 | 8/1972 | St, John . |
| 3,727,401 | 4/1973 | Fincher . |
| 3,811,275 | 5/1974 | Mastrobuono . |
| 3,937,009 | 2/1976 | Coleman . |
| 4,024,705 | 5/1977 | Hedrick . |
| 4,208,590 | 6/1980 | Blomquist et al. . |
| 4,272,953 | 6/1981 | Rice . |
| 4,577,460 | 3/1986 | Wirsching . |
| 4,821,512 | 4/1989 | Guile . |
| 4,969,326 | 11/1990 | Blessing . |
| 5,044,163 | 9/1991 | Brückner et al. . |
| 5,058,826 | 10/1991 | Coffinberry . |
| 5,129,227 | 7/1992 | Klees . |
| 5,161,368 | 11/1992 | Pomerleau . |
| 5,282,356 | 2/1994 | Abell . |
| 5,289,995 | 3/1994 | Greene . |
| 5,372,005 * | 12/1994 | Lawlor ................................ 60/39.35 |
| 5,408,824 | 4/1995 | Schlote . |
| 5,419,117 | 5/1995 | Greene . |
| 5,560,196 | 10/1996 | Schlote . |
| 5,636,509 | 6/1997 | Abell . |
| 5,660,038 | 8/1997 | Stone . |
| 5,709,076 * | 1/1998 | Lawlor ................................ 60/39.35 |

FOREIGN PATENT DOCUMENTS

| | | |
|---|---|---|
| 627121 | 9/1927 | (FR) . |
| 863484 | 4/1941 | (FR) . |
| 1407868 | 12/1965 | (FR) . |
| 3561 | 8/1881 | (GB) . |
| 366450 | 7/1930 | (GB) . |
| 400894 | 11/1933 | (GB) . |
| 581217 | 10/1946 | (GB) . |
| 645641 | 11/1950 | (GB) . |
| 648647 | 1/1951 | (GB) . |
| 2045870A | 11/1980 | (GB) . |
| 2113769A | 8/1983 | (GB) . |
| 2165310A | 4/1986 | (GB) . |
| 0370209 | 5/1990 | (GB) . |
| 2267733A | 12/1993 | (GB) . |
| 31718 | 2/1934 | (SU) . |
| WO 90/01625 | 2/1990 | (WO) . |
| WO 98/16722 | 4/1998 | (WO) . |

OTHER PUBLICATIONS

Schlichting, H., Boundary–Layer Theory, McGraw–Hill, Inc., New York, 1979, pp. 102–107; 646–653.

Theordorsen, T., and Regier, A., "Experiments On Drag Of Revolving Disks, Cylinders, and Streamline Rods At High Speeds," NACA Rept. 793, 1944.

Millsaps, K., and Pohlhausen, Kl., "Heat Transfer by Laminar Flow From a Rotating Plate," Journal of Aeronautical Sciences, vol. XX, 1952, pp. 120–126.

Ostrach, S., and Thornton, P.R., "Compressible Laminar Flow and Heat Transfer About A Rotating Isothermal Disk." NACA Tech., Note 4320, 1958.

Sparrow, E.M., and Gregg, J.L., "Mass Transfer, Flow and Heat Transfer About A Rotating Disk," ASME Paper 59–A–107, 1960.

Dutton, J.C. and Addy, A.L. "A Theoretical and Experimental Investigation of the Constant Area, Supersonic–Supersonic Ejector," AIAA Journal, vol. 20, No. 10, 1982, pp. 1392–1400.

Dutton, J.C., and Carroll, B.F., "Optimal Supersonic Ejector Designs," ASME Paper 86–WA/FE–3, Journal of Fluids Engineering, vol. 108, 1982, pp. 414–420.

Dutton, J.C., and Carroll, B.F., "Limitation of Ejector Performance Due to Exit Choking," Tech Brief, Journal of Fluids Engineering, vol. 110, 1988, pp. 91.

Oates, G.C., Aerothermodynamics of Gas Turbine and Rocket Propulsion, American Institute of Aeronautics and Astronautics, Inc., New York, 1984, pp. 119–139.

Anderson, J.D., Introduction To Flight, McGraw–Hill, Inc., New York, 1978, pp. 353–357.

Carpenter, P.J., and Radin, E.J., "Investigation of Ramjet Powered Helicopter Rotor on the Langley Helicopter Test Tower," NACA Res. Memo L53D02, Jun. 1953.

Radin, E.J., and Carpenter, P.J., "Comparison of the Performance of a Helicopter–Type Ram–Jet Engine Under Various Centrifugal Loadings," NACA Res. Memo L53H18A, Oct. 1953.

Hertsberg, A. et al., "Ram Accelerator: A New Chemical Method for Accelerating Projectiles to Ultrahigh Velocities," ATAA Journal, vol. 26, pp. 195–203, Feb. 1988.

Weber, K.F., et al, "Analysis of Three–Dimensional Turbomachinery Flows on C–Type Grids Using an Implicit Euler Solver," Journal of Turbomachinery, vol. 112, pp. 362–369, Jul. 1990.

Yungster, S., et al, "Numerical Simulation of Hypervelocity Projectiles in Detonable Gases," AIAA Journal, vol. 29, No. 2, pp. 187–199, Feb., 1991.

Pratt, D.T. et al, "Morphology of Standing Oblique Detonation Waves," AIAA Journal, vol. 7, No. 5, pp. 837–845, Sep.–Oct. 1991.

Bruckner, A.P., et al, "Operational Characteristics of The Thermally Choked Ram Accelerator," Journal of Propulsion, vol. 7, No. 5, pp. 828–836, Sep.–Oct. 1991.

Van Wie, D., et al, "Application of Busemann Inlet Designs For Flight At Hypersonic Speeds," AIAA paper 92–1210, 1992 Aerospace Design Conference, Feb. 3–6, 1992.

Yungster, S. et al, "Computational Studies of a Superdetonative Ram Accelerator Mode," Journal of Propulsion and Power, vol. 8, No. 2, pp. 457–463, Mar.–Apr., 1992.

Bogdanoff, D., "Ram Accelerator Direct Space Launch System: New Concepts," Journal of Propulsion and Power, vol. 8, No. 2, pp. 481–490, Mar.–Apr., 1992.

Soetrisno, M., et al., "Numerical Simulations of the Trans-detonative Ram Accelerator Combusting Flow Field on a Parallel Computer," AIAA paper 92–3249, AIAA/SAE/ASME/ASEE $28^{th}$ Joint Propulsion Conference and Exhibit, Jul. 6–8, 1992.

Yungster, S., "Numerical Study of Shock–Wave/Boundary–Layer Interactions in Premixed Combustible Gases," AIAA Journal, vol. 30, No. 10, pp. 2379–2387, Oct., 1992.

Li, C., et al, "Numerical Simulations of Reactive Flows in Ram Accelerators," Naval Research Laboratory, Washington, D.C., presented at 29 JANNAF Combustion Mtg., Oct. 19–22, 1992.

Zhang, F., et al., "Stability Studies of Detonation Driven Projectiles," Paper Accepted for Presentation At Proceedings of the $19^{th}$ Int'l Symposium on Shock Waves held at Marseille, France, Jul. 26–30, 1993.

Van Wie, D.M., "Application of Scramjet Engine Technology To The Design of Ram Accelerator Projectiles," presented at the JANNAF Combustion Meeting, Monterey, California, Nov. 15–18, 1993.

Pope, G.T., "Ramming Speed," Discover Magazine, vol. 15, No. 3, pp. 50–55, Mar., 1994.

Yungster, S., et al., "Computation of Shock–Induced Combustion Using a Detailed Methane–Air Mechanism," Journal of Propulsion and Power, vol. 10, No. 5, pp. 609–617, Sep.–Oct. 1994.

* cited by examiner

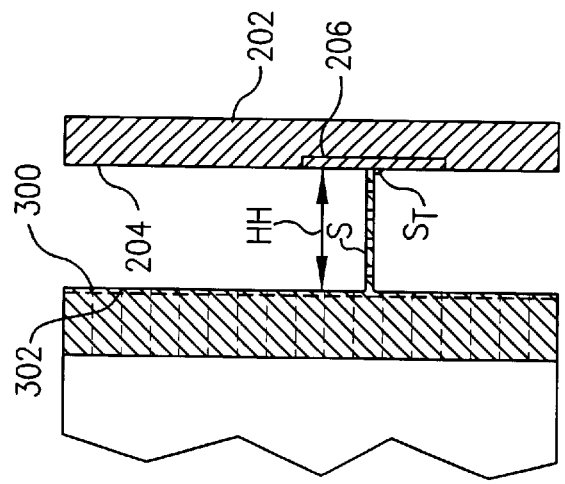
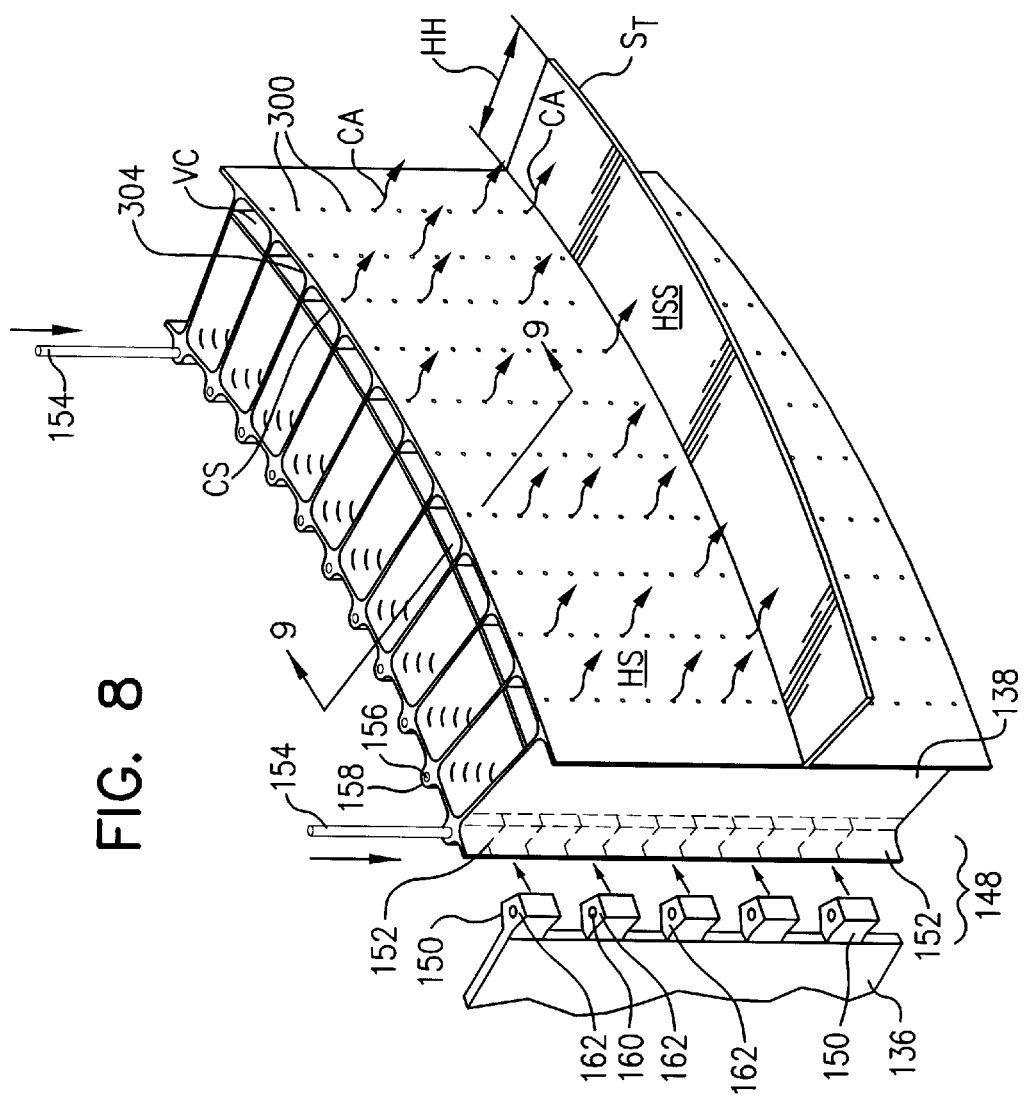

RAMJET ENGINE FOR POWER GENERATION

This application is a divisional of copending application Ser. No. 08/991,949 filed on Dec. 16, 1997.

The nonprovisional application designated above, namely application Ser. No. 08/991,949 filed of Dec. 16, 1997 claims the benefit of U.S. Provisional Application No.: 60/028,311 filed Dec. 16, 1996.

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

This invention uses ramjet technology for power generation. The fundamentals the technology were set forth in detail in my prior application Ser. No. 07/945,228, filed Sep. 14, 1992, now U.S. Pat. No. 5,372,005, issued Dec. 13, 1994. Certain embodiments were also provided in U.S. patent application Ser. No. 08/480,663, filed Jun. 7, 1995. Specific embodiments were also earlier disclosed in my U.S. Provisional Patent Application, Serial No. 60/028,311, filed Dec. 16, 1996. The disclosures of such patent applications, and the issued U.S. patent, all as just identified in this paragraph, are incorporated herein by this reference.

TECHNICAL FIELD OF THE INVENTION

My invention relates to a high efficiency, novel ramjet driven rotary engine, and to a method for the generation of electrical and mechanical power with the engine, while minimizing emission rates of nitrogen oxides. More particularly, my invention relates to a power plant driven by a ramjet engine, and to structures which are designed to withstand the extremely high tensile stress encountered in a rotating device with distally mounted ramjets operating at supersonic speeds. Power plants of that character are particularly useful for generation of electrical and mechanical power.

BACKGROUND OF THE INVENTION

A continuing demand exists for a simple, highly efficient and inexpensive thermal power plant which can reliably provide low cost electrical and mechanical power. This is because many electrical and/or mechanical power plants could substantially benefit from a prime mover that offered a significant improvement over currently practiced cycle efficiencies in power generation. This is particularly true in medium size power plants—largely in the 10 to 100 megawatt range—which are used in many industrial applications, including stationary electric power generating units, rail locomotives, marine power systems, and aircraft engines.

Medium sized power plants are also well suited for use in industrial and utility cogeneration facilities. Such facilities are increasingly employed to service thermal power needs while simultaneously generating electrical power al somewhat reduced overall costs. Power plant designs Which are now commonly utilized in co-generation applications include (a) gas turbines, driven by the combustion of natural gas, fuel oil, or other fuels, which capture the thermal and kinetic energy from the combustion gases, (b) steam turbines, driven by the steam which is generated in boilers from the combustion of coal, fuel oil, natural gas, solid waste, or other fuels, and (c) large scale reciprocating engines, usually diesel cycle and typically fired with fuel oils.

Of the currently available power plant technologies, diesel fueled reciprocating and advanced aeroderivative turbine engines have the highest efficiency levels. Unfortunately, with respect to the reciprocating engines, at power output levels greater than approximately 1 megawatt, the size of the individual engine components required become almost unmanageably large, and as a result, widespread commercial use of single unit reciprocating engine systems in larger sizes has not been developed. Gas turbines perform more reliably than reciprocating engines, and are therefore frequently employed in plants which have higher power output levels. However, because gas turbines are only moderately efficient in converting fuel to electrical energy, gas turbine powered plants are most effectively employed in co-generation systems where both electrical and thermal energy can be utilized. In that way, the moderate efficiency of a gas turbine can in part be counterbalanced by using the thermal energy to increase the overall cycle efficiency.

Fossil fueled steam turbine electrical power generation systems are also of fairly low efficiency, often in the range of 30% to 40% on an overall net power output to raw fuel value basis. Still, such systems are commonly employed in both utility and industrial applications for base load electrical power generation. This is primarily due to the high reliability of such systems.

In any event, particularly in view of reduced governmental regulation in the sale of electrical power, it can be appreciated that it would be desirable to attain significant cost reduction in electrical power generation. Fundamentally, particularly in view of long term fuel costs, this would be most effectively accomplished by generating electrical power at a higher overall cycle efficiency than is currently known or practiced.

SUMMARY OF THE INVENTION

I have now invented an improved power plant based on the use of a supersonic ramjet thrust module as the prime mover to rotate a power shaft. Tn using this method to generate electrical power, the supersonic ramjet thrust module is directly or indirectly coupled with an electrical generator. By use of a secondary fuel feed arrangement, the power output of the ramjet thrust module can be turned down as necessary to maintain constant rotating velocity, such as is necessary in synchronous power generation apparatus, at minimal output loads. Throughout its operating range, the supersonic ramjet power plant has greatly increased efficiencies when compared to those heretofore used power plants of which I am aware.

The designs incorporated into my power plant overcomes four significant and serious problems which have plagued earlier attempts at ramjet utilization for efficient electrical power production:

First, at the moderate mach number tip speeds at which my device operates (preferably, Mach 2.5 to about Mach 4.0), the design minimizes aerodynamic drag. This is accomplished by both reducing the effective atmospheric density that the rotor encounters, and by use of a boundary layer control and cooling technique. Thus, the design minimizes parasitic losses to the power plant due to the drag resulting simply from rotational movement of the rotor. This is important commercially because it enables a power plant to avoid large parasitic losses that undesirably consume fuel and reduce overall efficiency.

Second, the selection of materials and the mechanical design of rotating components avoids use of excessive quantities or weights of materials (a vast improvement over large rotating mass designs), and provides the necessary strength, particularly tensile strength where needed in the rotor, to prevent internal separation of the rotor by virtue of the centrifugal forces acting due to the extremely high speed rotor.

Third, the design provides for effective mechanical separation of the cool entering fuel and oxidizer gases from the exiting hot combustion gases, while allowing ramjet operation along a circumferential pathway.

Fourth, the design provides for effective film cooling of rotor rim components, including rim segments, rim strakes, and ramjet thrust modules. This novel design enables the use of lightweight components in the ramjet combustor and in the ramjet hot combustion exhaust gas environment, including potentially combustible components such as titanium.

To solve the above mentioned problems, I have now developed novel rotor designs which overcome the problems inherent in the heretofore known apparatus and methods known to me which have been proposed for the application of ramjet technology to stationary power generation equipment. Of primary importance, I have now developed a low drag rotor which has one or more unshrouded ramjet thrust modules mounted on the distal edge thereof. A number N of peripherally, preferably partially helically extending strakes S partition the entering gas flow sequentially to the inlet to a first one of one or more ramjets, and then to a second one of one or more ramjets, and so on to an Nth one of one or more ramjets. Each of the strakes S has an upstream or inlet side and a downstream or outlet side. For rotor balance and power output purposes, I prefer than the number of ramjets X and the number of strakes N be the same positive integer number, and that N and X be at least equal to two. The exhaust gases exiting from each of the one or more ramjets is effectively prevented from "short circuiting" by returning to the inlet side of subsequent ramjets. In the area of each ramjet combustor, this is effectively accomplished by the strakes S, due to overpressure in the ramjet combustor. Downstream from the ramjet exhaust area, and extending until just before the inlet to the next of the one or more ramjets, the prevention of bypass of the hot exhaust combustion gases to the cool entering fuel air mixture is effectively accomplished by the design of my one or more ramjet thrust modules, as it is preferred that the exhaust gases from each ramjet be expanded to approximately atmospheric pressure, so the strakes S merely act as a large fan or pump to move exhaust gases along with each turn of the rotor.

I have provided several embodiments for an acceptable high strength rotor. In a preferred embodiment, the rotor section comprises a carbon fibre disc. In another, it comprises a steel hub with high strength spokes. In each case, rim segments and ramjet thrust modules are preferably ieleasably and replaceably affixed to the rotor.

A rotor operating cavity is provided with lowered atmospheric pressure, preferably in the 1 psia range, in order to eliminate aerodynamic drag on the rotor. The vacuum conditions are assured by use of a vacuum pump to evacuate the operating cavity, and by the use of appropriate seals (a) at the rotor output shaft where it penetrates the operating cavity walls (b) at the rim segments, and (c) at the ramjet thrust modules.

The rim segments and the ramjet thrust module each include a cooling air receiving chamber. The chambers each have radially extending, preferably substantially parallel sidewalls, a radially proximal wall, and a radially distal wall, through which cooling gas outlet orifices penetrate. The cooling air receiving chamber functions as a centrifugal compressor for delivery of cooling gas to cooling gas outlet orifices. The exit of the cooling gas orifices is located on the surface of the rim segments and the ramjet thrust modules. The radial dimension at the start of each individual air receiving radially proximal wall determines the distance over which that air receiving chamber operates for compression, and thus determines the pressure of air delivered at the exit of a particular boundary layer cooling outlet orifice.

Attached at the radial end of the rotor are one or more of the at least one ramjets, each ramjet preferably having an unshrouded thrust module construction. The ramjet engines are situated so as to engage and to compress that portion of the airstream which is impinged by the ramjet upon its rotation about the aforementioned output shaft portions. Fuel is added to the air before compression in the ramjet inlet. The fuel may be conveniently provided through use of fuel supply passageways located in an annular ring, with fuel injection passageways communicating between the fuel supply passageways and the inlet air passageway. Fuel injected into the inlet air stream is thus well mixed with the inlet air before arriving at the ramjet engine combustion chamber. The combustion gases formed by oxidation of the fuel escape rearwardly from the ramjet nozzle, thrusting the ramjet tangentially about the axis of rotation of the output shaft portions, thus turning the rotor and the output shaft portions. The power generated by the turning shaft portions may be used directly in mechanical form, or may be used to drive an electrical generator and thus generate electricity. The operation of my ramjet engine may be controlled to maintain synchronous operation, i.e., vary the power output from the ramjet, while maintaining constant speed shaft operation.

When the ramjet power plant is used in a cogeneration configuration, the exhaust combustion gases from the ramjet are transported to a heat exchanger, where the gases are cooled as they heat up a heat transfer fluid (such as water, in which case the production of hot water or steam results). The heat transfer fluid may be utilized for convenient thermal purposes, or for mechanical purposes, such as for driving a steam turbine. Ultimately, the cooled combustion gases are exhausted to the ambient air.

Finally, many variations in the air flow configuration and in provision of the fuel supply, secondary fuel supply, and in providing startup ignitors, may be made by those skilled in the art without departing from the teachings hereof. Finally, in addition to the foregoing, my novel power plant is simple, durable, and relatively inexpensive to manufacture.

OBJECTS, ADVANTAGES, AND FEATURES OF THE INVENTION

From the foregoing, it will be apparent to the reader that one important and primary object of the present invention resides in the provision of a novel ramjet powered engine which can be cost effectively used to generate mechanical and electrical power.

More specifically, an important object of my invention is to provide a ramjet driven power generation plant which is capable of withstanding the stress and strain of high speed rotation, so as to reliably provide a method of power generation at high efficiency.

Other important but more specific objects of the invention reside in the provision of power generation plants as described in the preceding paragraph which:

have high efficiency rates; that is, they provide high heat and high work outputs relative to the heating value of fuel input to the power plant;

in conjunction with the preceding object, provide lower power costs to the power plant operator and thus ultimately to the power purchaser than is presently the case;

allow the generation of power to be done in a simple, direct manner;

have a minimum of mechanical parts;

avoid complex subsystems;

require less physical space than many existing technology power plants;

are easy to construct, to start, to operate, and to service;

cleanly burns fossil fuels;

in conjunction with the just mentioned object, results in fewer negative environmental impacts than most power generation facilities currently in use;

have a rotating element with a minimal distally located mass structure, and which is thus able to withstand the stresses and strains of rotating at very high tip speeds; and which provides for operation with minimal aerodynamic drag.

One feature of the present invention is a novel high strength rotor structure. In one design, a high strength steel inboard section is provided with high strength spokes that at their distal end suspend a rotating rim that has unshrouded ramjet thrust modules integrated therein. This unique structure enables operation at rotational speeds above stress failure limits of many conventional materials, while simultaneously providing for adequate cooling of the rim and ramjet structure, in order to maintain material integrity, at the high temperature operating conditions. In another design, a carbon fiber epoxy composite disc is provided, which simplifies the overall construction while providing an abundance of strength, while still providing a ventilated positive cooling system design to maintain structural integrity of the rotor, and of the rim and ramjet structure.

Another feature of the present invention is the use of a unshrouded ramjet design. In this design, the stationary, peripheral wall which surrounds the ramjet functions as part of the ramjet thrust module. This unique design enables use of a minimal rotating mass at the high design tip speeds, thereby enabling the rotor to be designed with lower strength materials and/or a higher margin of safety with respect to overall tensile strength requirements for a given ramjet operational mach number.

Still another important feature of the present invention is the use of strakes to partition the ramjet inlet air flow (and preferably in which inlet air flow the fuel and air are pre-mixed) from the ramjet exhaust gas flow. This elegant design feature assures that exhaust gases are directly removed from the engine, and that only the amount of inlet air necessary for combustion in the ramjets is required to be provided.

Other important objects, features, and additional advantages of my invention will become apparent to those skilled in the art from the foregoing and from the detailed description which follows and the appended claims, in conjunction with the accompanying drawing.

BRIEF DESCRIPTION OF THE DRAWING

FIG. 8 shows a rim segment with integral strake segment, and also clearly showing the cooling air passageways and their exit pathway, the film cooling orifices.

FIG. 9 is a partial cross sectional view, taken as if through a portion of section 9—9 of FIG. 8, showing the close fitting relationship of the rotor strake with the interior surface of the peripheral wall.

DETAILED DESCRIPTION

Figure 1:
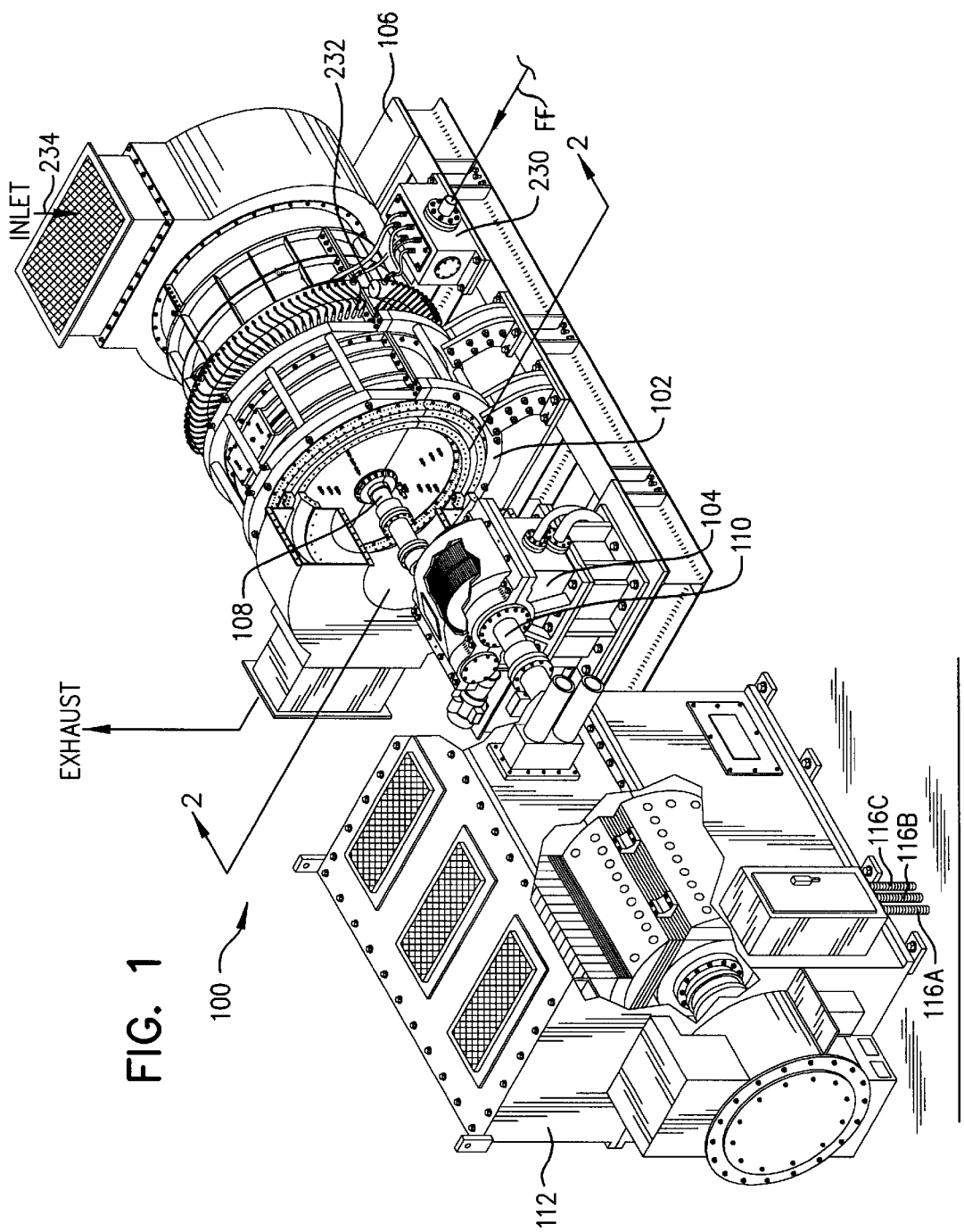
FIG. 1 provides a partial perspective view of my novel power plant apparatus, showing the primary rotor of the power plant rotating within its housing, to drive an output shaft portion which is usually advantageously coupled with a gear box, which is then operatively connected to an electric generator.

Referring now to the drawing, FIG. 1 depicts a partial cut-away perspective view of my novel supersonic ramjet driven power plant 100. Major components shown in this FIG. 1 include the supersonic ramjet engine assembly 102 and gear set 104 on ramjet engine skid 106. The ramjet engine assembly 102 has a driven output shaft 108, which is coupled with gear set 104 for power transfer therethrough. Gear set 104 has power output shaft 110, which is coupled with and rotates at a desired rate of rotation to drive electrical generator 112. Power is output from electrical generator 112 via cable in conduits $116_A$, $116_B$, and $116_C$.

Figure 11:
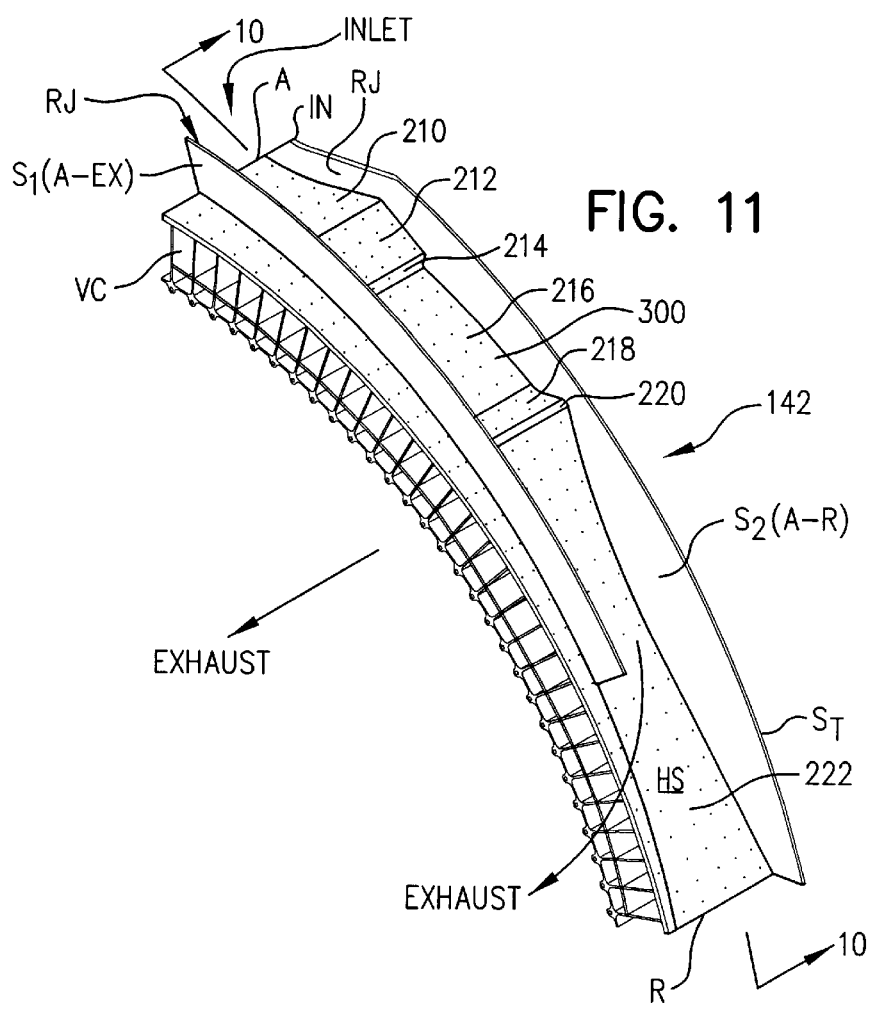
FIG. 11 shows a perspective view of the thrust module and integral strake just set forth in FIG. 10.
Figure 12:
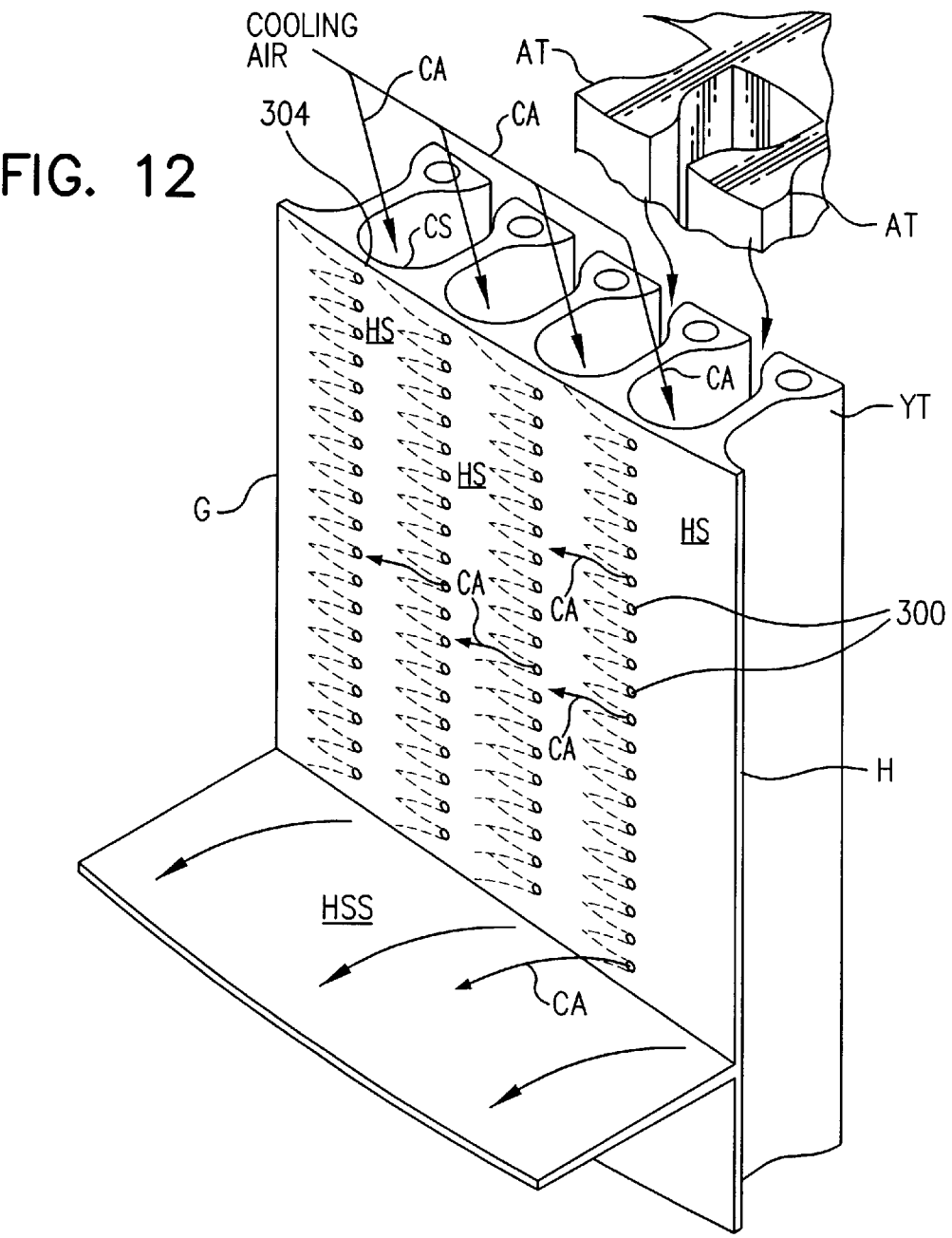
FIG. 12 shows a perspective view of one embodiment of a rotor segment with integral strake, revealing details of the film cooling orifices and related radial boundary layer flow on the strake.
Figure 18:
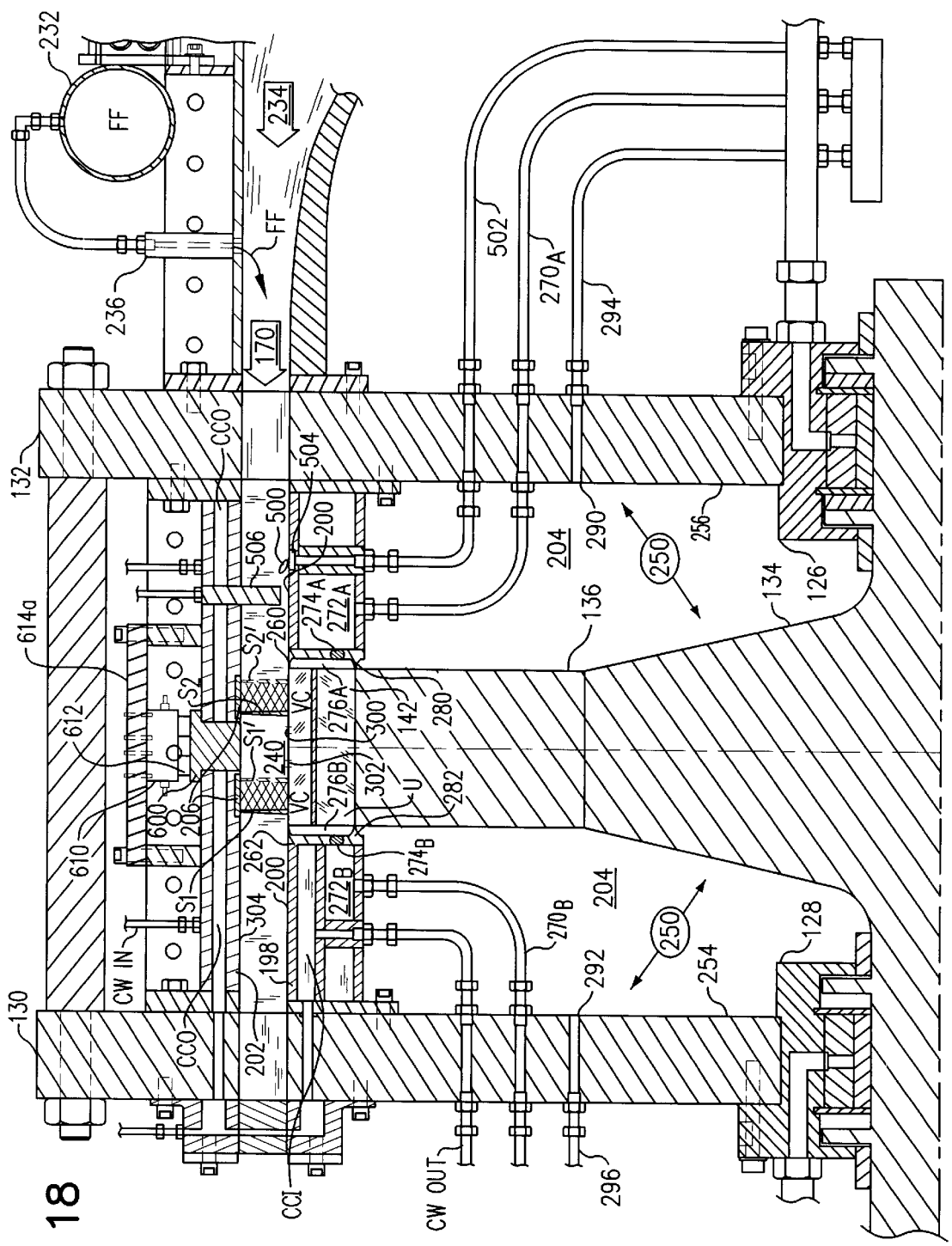
FIG. 18 is a modified partial cross-sectional view of my novel power plant, which shows details of the cooling system, and the annular valve, and the varying position of strakes as the rotor turns about its axis of rotation.

The structure of the supersonic ramjet engine which is integrally housed in ramjet engine assembly 102 can be understood by review of related FIGS. 2, 4, 7, 8, 10, 11, and 18. I have now developed a high strength rotor 120 which has output shaft portions 108 and 124. The output shaft portions 108 and 124 turn in inlet and outlet bearing assemblies 126 and 128, respectively, which bearing assemblies are housed in frames 130 and 132, respectively. In FIGS. 2, 7, 8, 10, and 11, one embodiment of my high strength rotor 120 design (or components thereof), is shown, illustrating rotor construction using a monolithic rotor hub 134 (preferably high strength steel), to which are secured radially extending spokes 136, and from which are secured ventilatable rim segments 138, or alternately, a ventilatable unshrouded ramjet 142 such as depicted in FIGS. 11 and 18.

Figure 2:
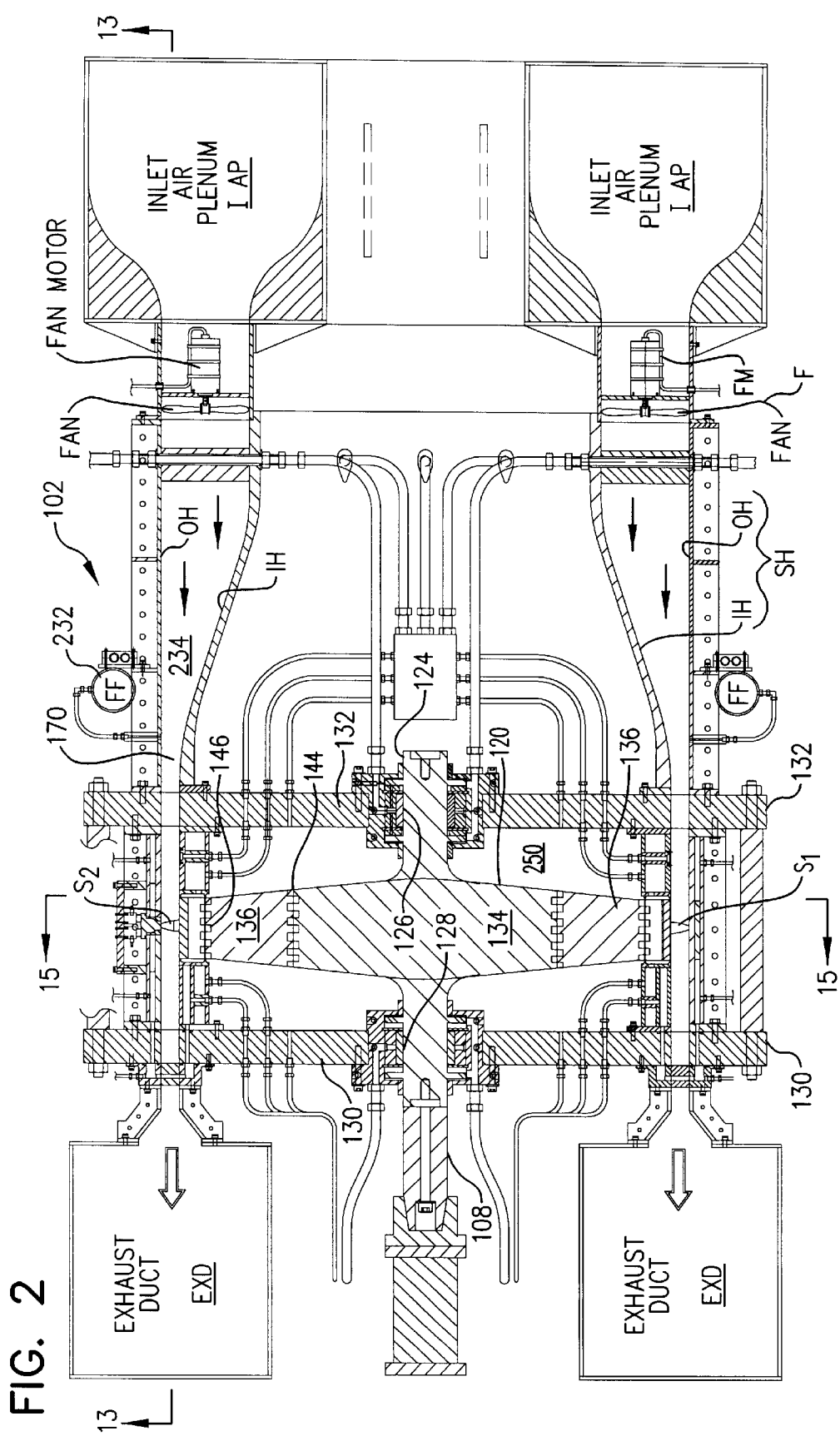
FIG. 2 is a partial sectional view of my ramjet power plant apparatus, showing a rotating output shaft portion affixed to a rotor and rotatably secured therewith, and an unshrouded ramjet thrust module integrally provided with the rotor. Additionally, the inlet air duct is shown, along with the transition to an annular passageway having a peripherial wall section in the combustion zone; the exhaust gas outlet from the combustion zone also shown, along with the exhaust qas ducting. Cooling air, cooling water, and the vacuum lines used for evacuating the rotor rotating space are illustrated.
Figure 3:
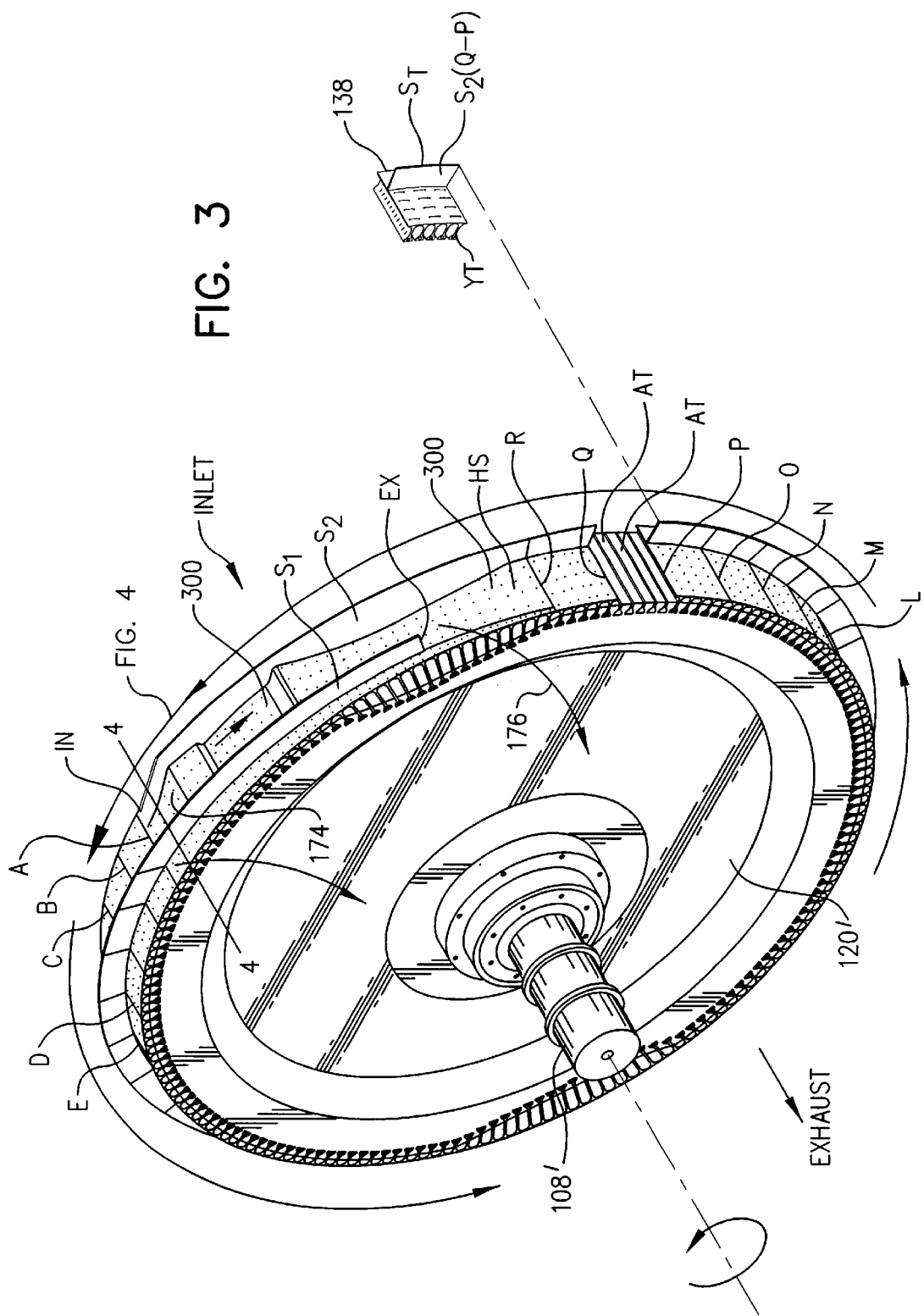
FIG. 3 is a perspective view of a carbon rotor with integral (a) rim, (b) unshrouded ramjet, and (c) strake, showing in particular a rim segment with strake segment.

For ease of construction, I prefer to use a piano hinge type attachment arrangement, as can be seen in FIGS. 2 and 8, for (a) interlocking hinges 144 between hub 134 and spokes 136, or (b) interlocking hinges 146 are provided between spokes 136 and each ramjet. As depicted in FIG. 8, interlocking hinges 148 between spokes 136 and rim segments 138 are formed by hinge segments 150 on spokes 136 and complementary hinge segments 152 on rim segments 138. Preferably, a pin 154 is used for insertion in a tight fitting relationship through aperture 156 which is defined by wall 158 in rim segment 138, and through matching aperture 160 defined by wall 162 in spoke 136. Similar parts are used for construction of the hinged joint 146 between spokes 136 and the ramjet 142. As provided, any of the rim segments 138 or the ramjet thrust modules U such as module 142 are releaseably affixed as a part of rotor 120, and thus rim segments 138 and the ramjet thrust modules may be easily replaced.

FIGS. 3, 5, 6, and 12 depict a similarly functioning design using carbon fibre materials for the rotor 120', a series of T-shaped attachment tabs AT are cut into rotor 120' Tabs AT are slipped down between filled Y-shaped tines YT extending inwardly from each of the rim segments 138 or ramjet thrust modules U.

Figure 4:
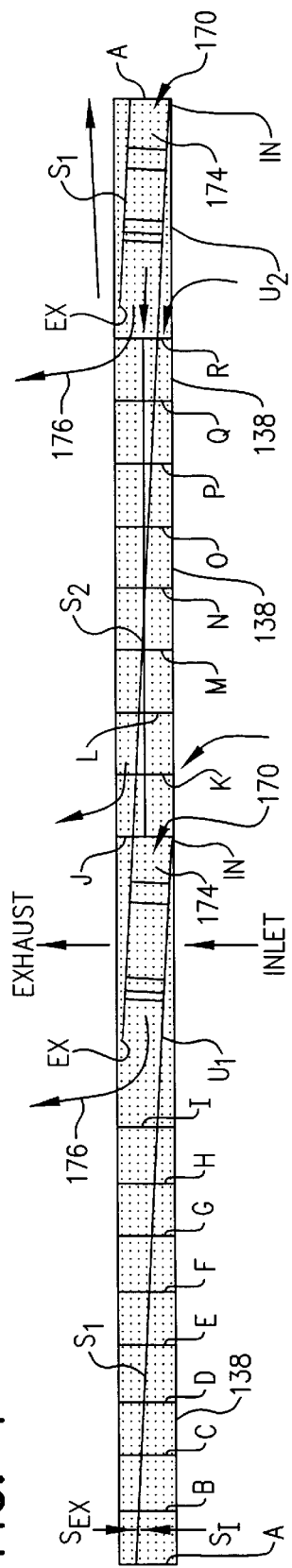
FIG. 4 is a circumferential edge view of a rotor, taken as starting at line 4—4 of FIG. 3 on the circumference of the rotor, with the edge peeled and laid out flat, showing a pair of unshrouded ramjet thrust modules and the relationship to rim segments with integral strake segments.

As seen in FIG. 4, the circumference of rotor 120 is made up of a plurality of rim segments 138 and one or more ramjets U such as ramjet 142. Importantly, there are also a number of peripherially extending strakes $S_1$ through $S_N$. Each of strakes $S_1$ through $S_N$ has a number of strake segments, each strake segment being integrally formed with a rim segment 138, or with a ramjet 142, as appropriate. Each of the strake segments may be defined by their edge pair, as seen in FIG. 4 starting at $S_1$(IN-I) at the inlet IN for mixed gas 170, then on to $S_1$(I-H), then to $S_1$(H-G), and so on through to $S_1$(A-EX), which ends at the exhaust point EX of the strake for combustion gases 176. Similarly, strake segments for strake $S_2$ start at $S_1$(IN-R), at the inlet IN, then sequentially extend on to $S_2$(R-Q), etc., in like manner. The strakes $S_1$ through $S_N$ partition entering gas 170 (which preferably is mixed to provide both fuel and oxidizer), so that the mixed gas 170 flows to the ramjet inlet throat 174. This process occurs at a first ($U_1$) of one or more unshrouded ramjets U and then at a second ($U_2$) of one or more unshrouded ramjets U and so on to an Xth ($U_X$) one of the one or more unshrouded ramjets U which are mounted for rotation at the distal edge of rotor 120. For rotor 120 balance purposes, I prefer that the number X of ramjets U and the number N of strakes S be the same positive integer number, and that N and X each be at least equal to two.

The strakes $S_1$ through $S_N$ allow feed of mixed gas 170 to each ramjet $U_X$ without appreciable bypass of the entering mixed gas 170 to the exhaust combustion gases 176. Also, and most importantly, the exhaust combustion gases 176 exiting from each of the one or more ramjets U is effectively prevented by the arrangement of strakes S from "short circuiting," and thus substantially prevent the return of combustion gases 176 from the exhaust side $S_{EX}$ to the inlet side $S_I$ of subsequent ramjets. This strake feature can be better appreciated by considering the rotor or rotating assembly 120 (at respective portions thereof as seen in the various figures of the drawing) which revolves in close proximity (a) to a fixed, annular shaped inboard housing 198 with inboard wall surface 200, and (b) to a preferably fixed, annular shaped peripheral wall 202 which has an interior peripheral wall surface 204. The strakes S have a height HH which extends to a tip end $S_T$ that is designed for rotation very near to the interior peripheral wall surface 204. As seen in FIGS. 9 and 18, a wear ring 206 of soft, sealing metal is provided as an insert into the fixed peripheral wall 202, to allow for tight fitting abutment of the tip end $S_T$ of strake S with the wear ring 206 that is provided in the peripheral wall surface 204.

Figure 5:
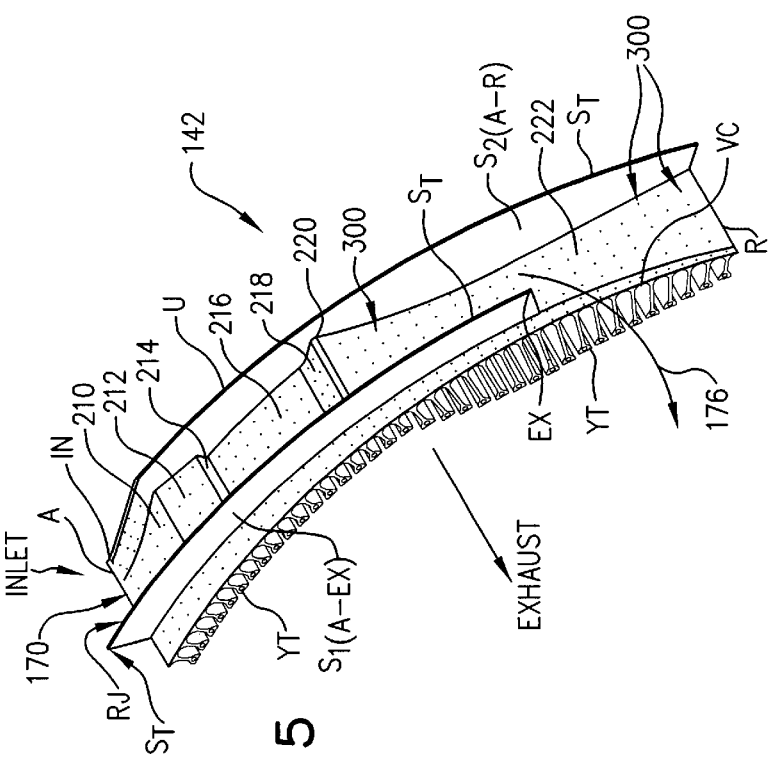
FIG. 5 shows, in perspective, a rim segment which includes an unshrouded ramjet thrust module and related integral strake segments.
Figure 6:
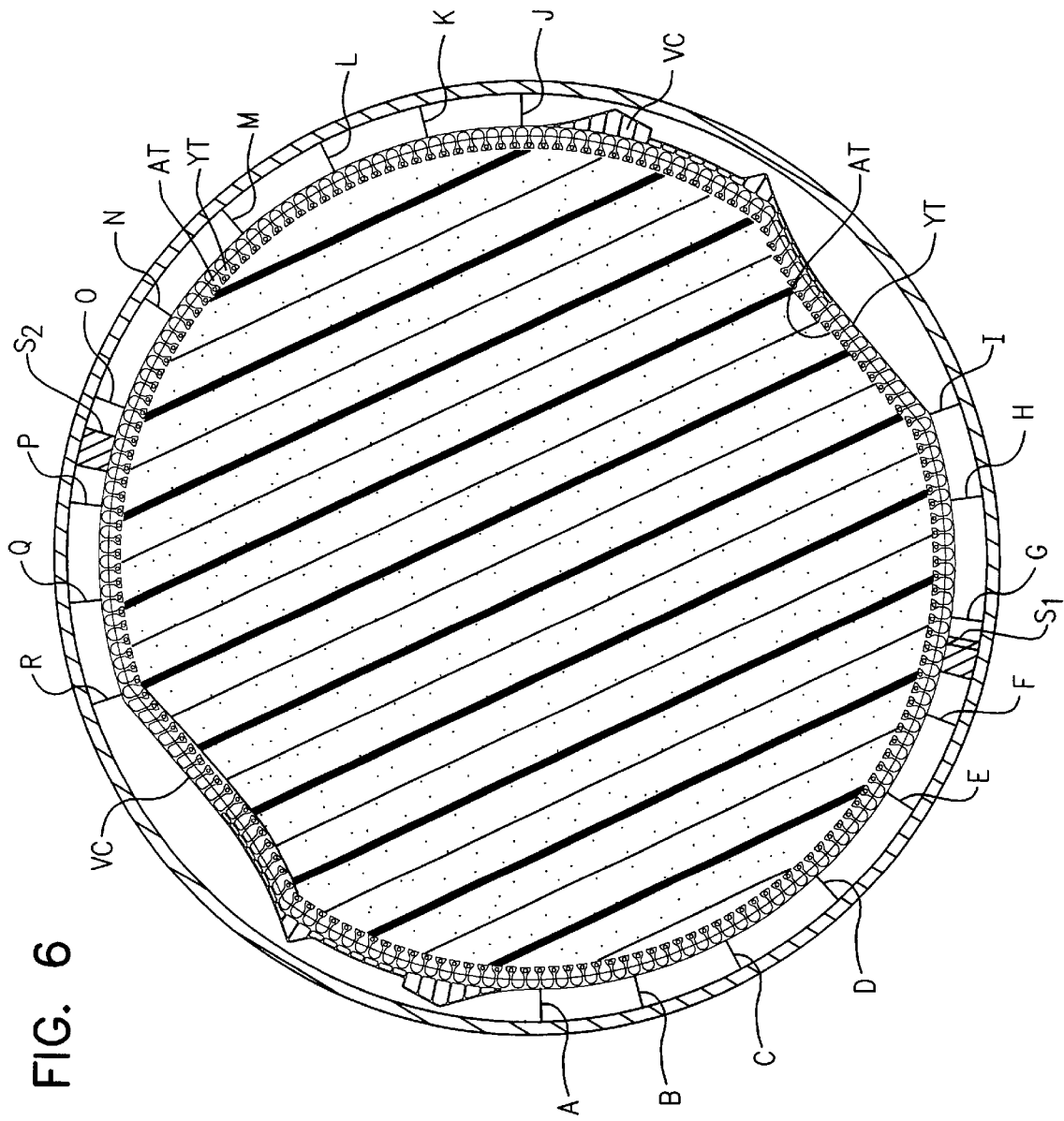
FIG. 6 provides a cross-sectional view of a carbon fibre rotor, unshrouded ramjet thrust modules, and the related peripheral wall.
Figure 7:
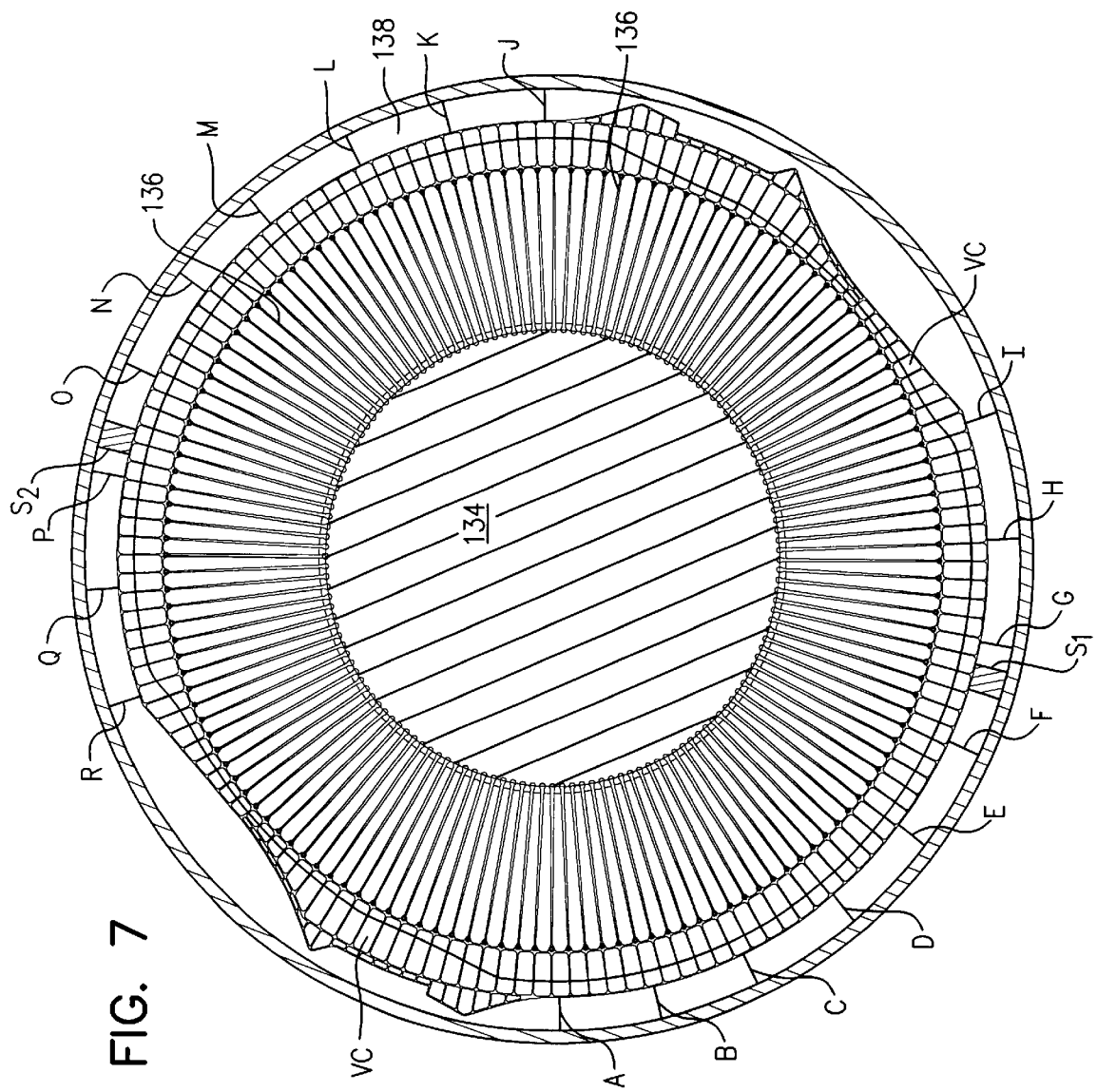
FIG. 7 provides a cross-sectional view of second embodiment of my rotating assembly, showing a steel rotor, unshrouded ramjet thrust modules, and the related peripheral wall.
Figure 10:
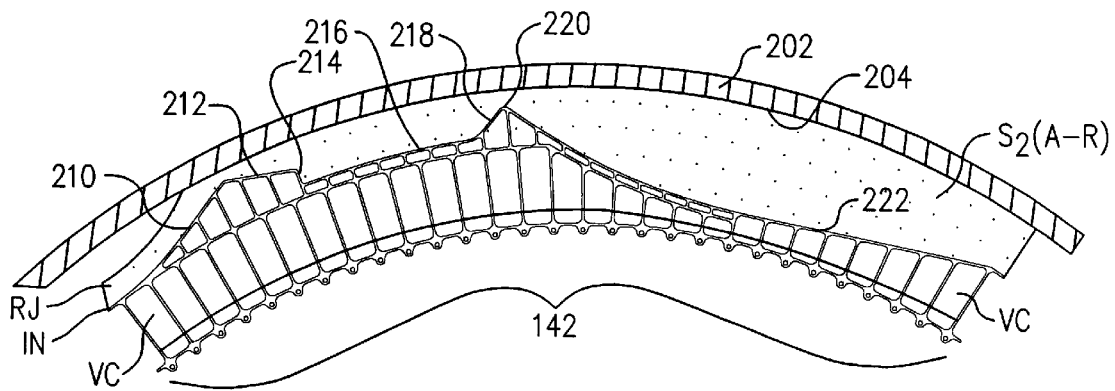
FIG. 10 shows, in a partial cross sectional view, one embodiment of a thrust module and integral strake.

The construction and operation of my ramjet(s) U is also unique. The ramjet thrust modules U, such as seen in FIGS. 5 and 11, are provided in an unshrouded configuration, that is, the structures depicted in FIGS. 5 and 11 provide the necessary elements for compression of incoming air, except for a containment structure against which compression and expansion occurs. In this unique engine, the containment structure is provided by the interior peripheral surface 204 of wall 202 as seen in FIG. 9.

The actual compression area and ramjet structure can be seen in FIGS. 5 and 11. An incoming mixed gas stream 170 is compressed by ramjet inlet structure 210, between the ramjet side RJ of inlet portion of $S_2$(IN-R) and the ramjet side RJ of inlet portion of $S_1$(A-EX) Subsequently, transition section 212 is provided to stabilize the normal shock process, which is followed by a stepdown to the combustor 216 at flameholder 214. Then, combustion takes place in combustor 216, and pressure builds to about one hundred eighty pounds per square inch (or another suitable pressure, depending upon the design chosen in this critical region) due to the buildup of combustion gases against the geometric throat 218 as they build up to the choke point 220. After exiting the choke point 220, in the outflow nozzle 222, the combustion gases expand to near atmospheric pressure and cool, normally to about 1100° F. or thereabouts. The preferably helical strakes $S_1$ and $S_2$ are thin walled, with about 0.15" width (axially) at the root, and about 0.10" width at the tip. With the design illustrated herein, it is believed that leakage of combustion gases will be minimal, and substantially limited to the region of the combustor 216.

Turning now to FIGS. 2 and 18, the overall structure of the prime mover in my power plant is further illustrated in these views. Ramjets $U_1$ and $U_2$ are suitable for oxidizing a fuel FF continuously supplied thereto through from a fuel main (not shown) to fuel supply pressure regulator 230 (see FIG. 1), thence to fuel supply manifold 232 and into an entering airstream 234 via injectors 236, to provide a mixed gas air stream 170. The entering airstream 234 is preferably provided through an annular supply housing SH defined by inner walls IH an outer walls OH, by fans F as driven by motor FM, or by other suitable means of combustion air supply from an inlet air plenum IAP. The injectors 236 are preferably located sufficiently upstream of the ramjets U so as to allow adequate fuel mixing. The mixed gas stream 170 is fed to ramjets U, which utilize oxygen from the incoming airstream 234 (from an ambient air supply at the plant site) as the oxidant source. Ramjets U are provided at the outer, distal reaches of rotor 120 (or carbon type rotor 120') so that the propulsive effect of the ramjets U is utilized to turn rotor 120 or 120' including (preferably directly) the output shaft 108.

The rotor 120 is rotatably secured in an operating position by a fixed support structure or frames 130 and 132 in a manner suitable for extremely high speed operation of the rotor 120, such as rotation rates in the range of 10,000 to 20,000 rpm, or higher. In this regard, inlet side bearing assembly 126 and outlet side bearing assembly 128, or suitable variations thereof, must provide adequate bearing support for high speed rotation and thrust, with minimum friction, while also sealing the operating cavity 250, so as to enable provision of a vacuum environment having an operating pressure of about 1 psia. The detailed bearing and lubrication systems may be provided by any convenient means by those knowledgeable in high speed rotating machinery, and need not be further discussed herein.

An operating cavity 250 is formed between interior peripherial wall 204 and the interior 254 of frame 130 and the interior 256 of frame 132. This cavity is evacuated to about 1 psia during normal operation. As seen in FIG. 18, an outer labyrinth type seal 260 is provided on the inlet side and another labyrinth type seal 262 is provided on the outlet side of the ramjet thrust module U. These seals hinder "in-leakage" toward the evacuated operating cavity 250.

For cooling of the rim segments 136 and the ramjet thrust modules $U_1$ and $U_2$, a supply of compressed air is provided through air lines 270A and 270B. I prefer to supply air at about 250 psig and about 80° F. to chamber 272A and 272B, and allow it to expand through porous metal orifices 274A and 274B to about 13.5 psia and about –150° F. (minus 150° F.), before entering distribution chambers 276A and 276B. From distribution chambers 276A and 276B, the cooling air is injected into each ventilation chamber VC of the respective rim segment 136 or ramjet thrust module U such as thrust module 142. Leakage of the cooling air from chambers 276A and 276B to the operating cavity 250 is substantially prevented by labrynth type seals 280 and 282.

Vacuum in cavity 250 is maintained via pump (not shown) acting on ports 290 and 292 to vacuum lines 294 and 296.

A second embodiment for a desirable rotor design is shown in FIGS. 3, 5, 6 and 12. Here, a high strength carbon fibre rotor 120' is provided. The rotor 120' has a high strength inboard portion and output shaft 108' which secured to inboard portion and rotatable therewith.

As illustrated particularly in FIGS. 4, 5, 8, 11, and 12, I prefer the use of ventilatable, film cooled surfaces, including in combustion chamber 216 on ramjet U. Cooling air is supplied, preferably via compressed air, to a ventilation chamber, such as chamber VC in each portion of the ramjet U. The ventilation chambers VC act as a centrifugal compressor, and the compressed cooling gas is sent outward through outlets 300 of cooling passageway orifices 302 as depicted in FIG. 9. A high density pattern of cooling air passageway orifices 302 is preferably provided; the exact parameters depend upon the characteristics of a particular design, including the speed (Mach number), capacity, and other factors. In this manner the ventilatable rim segments 138 and the ventilatable unshrouded ramjets 142 are provided with a cooling air flow path through a coolable wall 304, located between the ventilation chambers VC, which include an inner cold surface CS, and a hot surface HS located on the radially distal side of the rim segments 138 and ramjets 142. Due to the swirling action of the strakes, the cooling air CA emerging from outlets 300 of orifices 302 is advantageously swept along the hot surface HSS of the strakes for cooling of the same. Note that in FIG. 8 the cooling air arrows CA are exaggerated to diagramatically depict the flow of cooling air outward through outlets 300. In actual practice, the cooling air CA encounters the high speed flow of combustion gas 176 and a very thin, but effective cooling film is formed. Of course, one side of each strake S is primarily in contact with cool mixed gas inlet air 170. This film cooling method is important since it allows the use of materials such as titanium in a combustion environment. In this manner, the high temperature generated from combustion is prevented from damaging the combustor and other parts subjected to heating by the hot exhaust gases.

Cooling water CW is provided to outside cooling chambers CCO for cooling the peripheral wall 202 and its surface 204, and to inside cooling chambers CCI for cooling the wall 198 and its surface 200.

A key feature of my power plant is the rotor 120. Rotor 120 spins about its axis of rotation due to thrust from ramjets U. Two design parameters of the rotor 110 are extremely important. First, the rotor must be constructed of materials which enable it to survive the extremely high centrifugal loads encountered while the rotor is moving so that the ramjet can operate in the Mach 3.5 range, i.e., the rotor must be capable of withstanding extremely high tensile stress. Second, at such speeds, minimizing the rotor's overall aerodynamic drag is critical.

Figure 16:
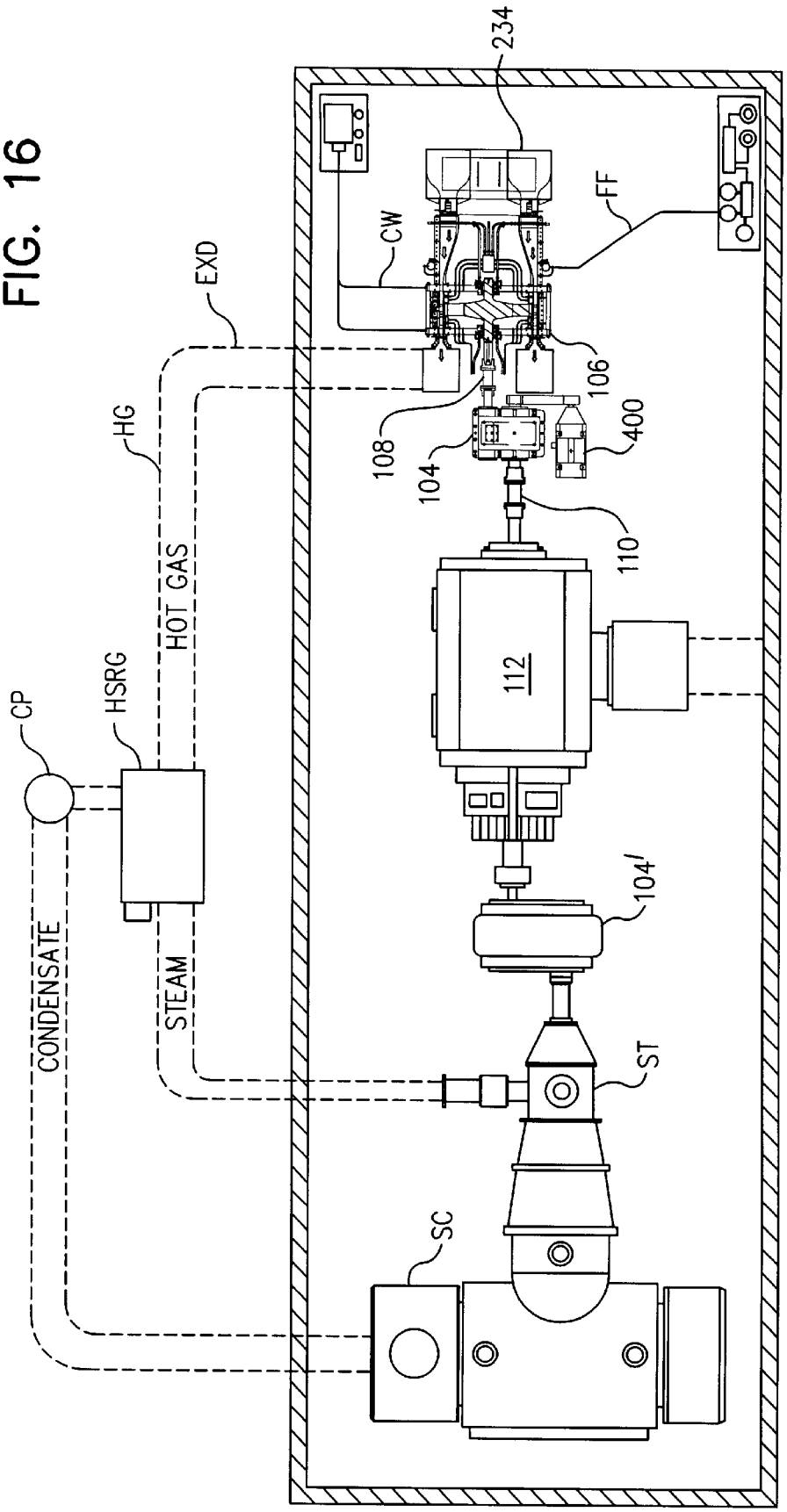
FIG. 16 is a plan view of combined cycle power plant which uses my novel supersonic ramjet driven rotor and its thrust modules as a prime mover, provided as shown using the combination of an electrical generator and a steam turbine (which may also be used for electrical generation).
Figure 17:
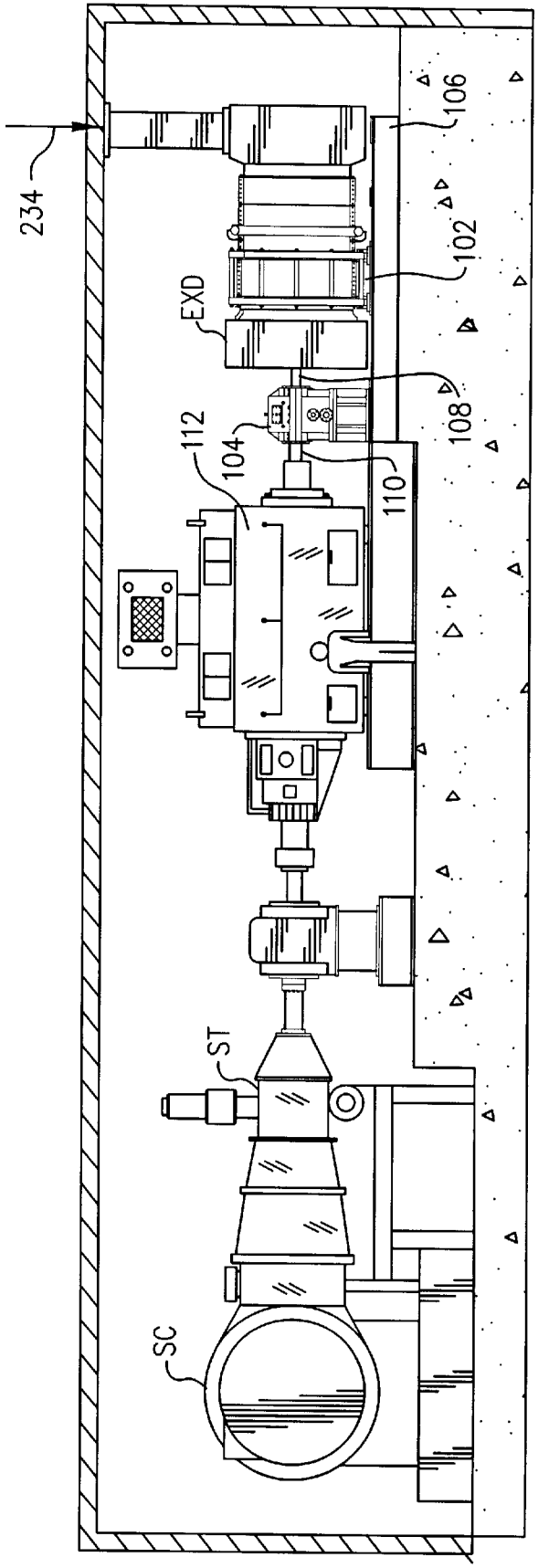
FIG. 17 is a side elevation view of a combined cycle plant which uses my novel ramjet driven rotor as a prime mover, provided as shown in combination with an electrical generator and steam turbine.

Attention is now directed to FIGS. 16 and 17, where my power plant is illustrated in conjunction with necessary power generation equipment. The shaft portion 108 acts in conventional fashion to transmit mechanical power to the primary gear-box 104. The gear-box 104 reduces the speed between shaft 108 and shaft 110 to a sufficiently low level to accommodate the capabilities of the desired application. In FIGS. 1, 16, and 17, the primary gear-box 104 is connected by shaft 110 to primary electrical generator 112, suited to generate electrical power for transmission to a power grid or other electrical load. However, shaft 110 could he applied directly to do desired mechanical work.

For startinq the plant, a starter motor 400 is shown connected to gear set 104. The motor 400 is configured to rotate rotor 120, and bring the ramjet thrust modules U up to a convenient tangential velocity so as to enable the start of the ramjets U. Once ramjets U are running, the motor 400 is turned off.

Starting, as well as modulating the ramjets U can be accomplished with a secondary fuel 500 supplied via line 502 to injectors 504. This fuel is lit by a plasma torch 506 or other suitable igniter, preferably in airfoil shape in the inlet air stream, to feed into the ramjet U. Once this secondary fuel supply is started on the ramjet flame holder 214, the fuel FF is then introduced through injectors 236.

Figure 13:
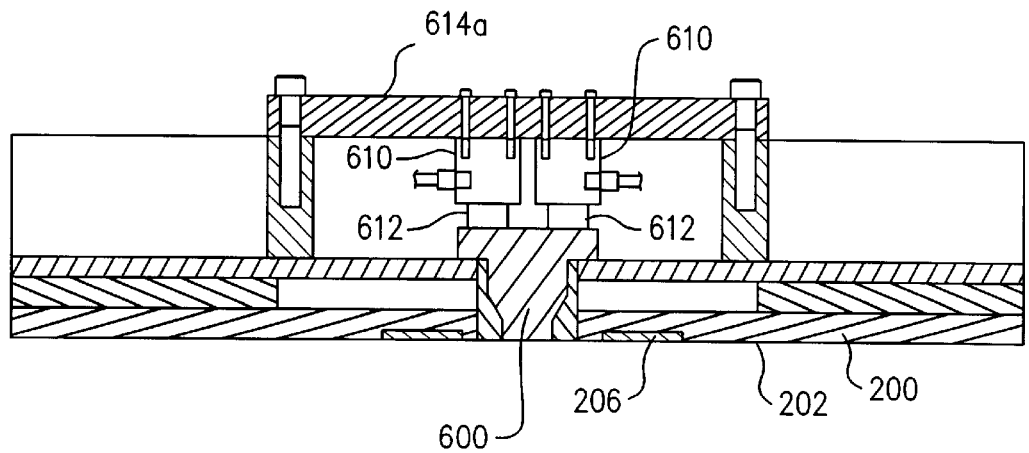
FIG. 13 shows a cross-sectional view of a section of the peripherial wall portion of the power plant, taken as if along a portion of line 13—13 of FIG. 2 in the region adjacent the strake, showing an annular segment gate valve in a closed position.
Figure 14:
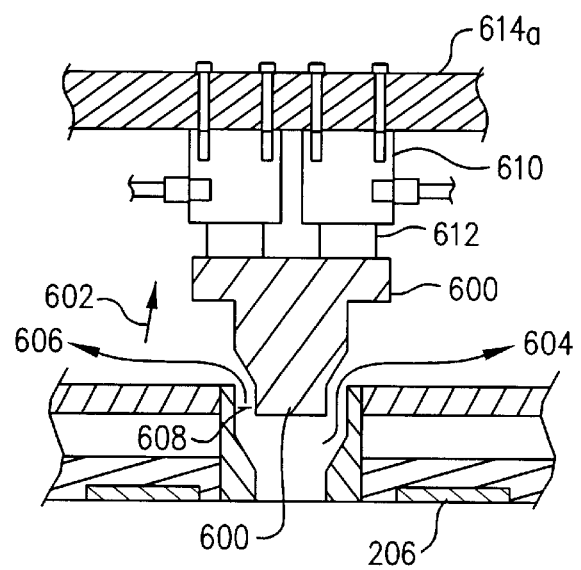
FIG. 14 shows a cross-sectional view of a section of the peripherial wall portion of the power plant, similar to FIG. 13 above, but now showing the annular segment gate valve in an open position, as used to spill air through the peripheral sidewall during startup.
Figure 15:
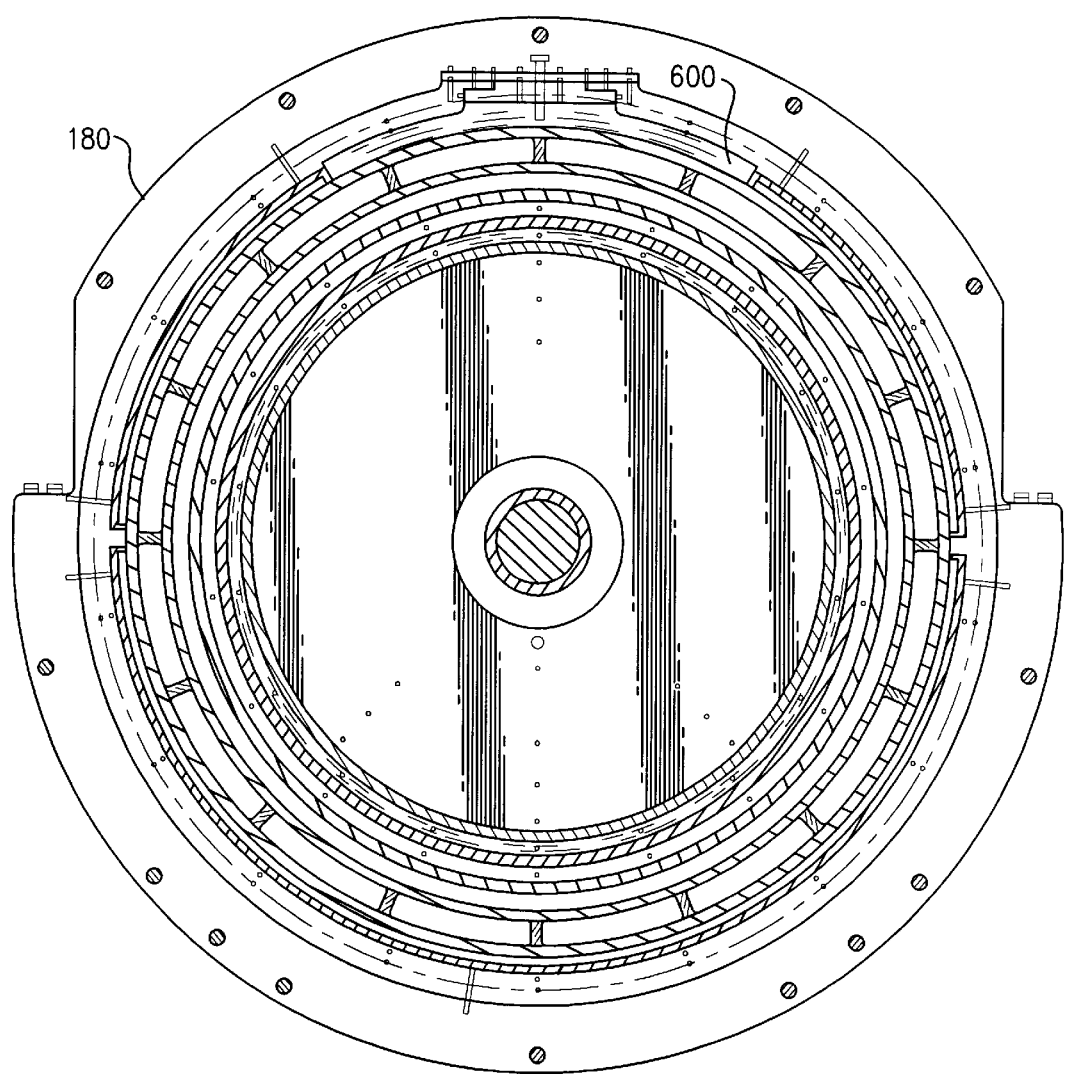
FIG. 15 shows a vertical elevation view of one frame of the power plant, taken along line 15—15 of FIG. 2, showing the frame, exhaust passageways, peripheral wall, and passageways for cooling air and cooling water.

As seen in FIGS. 13, 14, and 18, a series of variable position annular gate valves is provided around the edge of peripherial wall 200. For starting, the annular gate valve 600 is opened in the direction of reference arrow 602 as shown in FIG. 14, forming a gap 608, so that a portion of the incoming air which is being compressed against wall surface 200 can escape outwardly in the direction of arrows 604 and 606. The unique partially shrouded ramjet 162 allows this escapement of bypass air 604 and 606. Once the ramjet U has "swallowed" the shock structure, then the gate valve(s) 600 can be closed by actuator 610, as illustrated in FIG. 13. I have shown a hydraulic actuator 610 with shaft 612, mounted by bracket 614a. Any convenient mechanical, electrical, or hydraulic actuator may be utilized as convenient for this purpose.

Also shown in FIGS. 16 and 17 is the use, in a combined cycle system, of hot exhaust combustion gases from ramjets U. As shown, the hot exhaust gases are conveniently collected by an exhaust gas duct EXD. The exhaust gas duct EXD is directed to a heat recooperator steam generator (HSRG), where steam is produced for driving a steam turbine ST, by heating condensate returned from the steam condenser SC via condensate pump CP. This is the commonly encountered design, where the working fluid is water. Although the water is most easily heated to high pressure steam and thereafter used to drive a steam turbine, it can also be used for supply of thermal energy in a co-generation application. Also, as illustrated, the steam turbine ST can be used to produce shaft work for use in electric generator 112 or an alternate electrical generator, typically through gear box 104'. Alternately, the steam turbine ST could be utilized to provide shaft work for other purposes.

Because the ramjet thrust determines the overall power plant output, the thrust from the ramjet is an important figure of merit for overall plant output levels. The ramjet thrust levels and the overall plant output levels increase in direct proportion with the mass captured and processed by the ramjet. Thus, doubling the inlet area and mass capture results in doubling the thrust generated, and thus results in doubling the power output of the system.

Finally, even though high combustion temperatures are experienced, my design allows extremely low nitrogen oxide output. This is because of the short residence times at the high combustion temperatures, and because the fuel is extremely well mixed. This shock-boundry layer interaction premixing technique is a unique approach for achieving a near perfectly premixed conditions and low nitrogen oxides emission. Thus, nitrogen dioxide emissions are limited by limiting the size of highly non-equilibrium free-radical zones in the combustor. NOx emissions are estimated to be less than 5 ppm, or EI is less than 0.5 grams of nitrogen dioxide per kilogram of fuel.

The method and apparatus for producing mechanical, electrical, and thermal power as described above provides a revolutionary, compact, easily constructed, cost effective power plant. The output from this power plant can be used in conjunction with existing power delivery systems, and represents a significant option for reducing air emissions by combustion of clean burning fuels. Further, given the efficiencies, dramatically less fuel will be consumed per unit of electrical, mechanical, or thermal energy generated.

It will thus be seen that the objects set forth above, including those made apparent from the proceeding description, are efficiently attained, and, since certain changes may be made in carrying out the construction of a power generation apparatus and in the execution of the method of power generation described herein, while nevertheless achieving desirable results in accord with the principles generally set forth herein, it is to be understood that the invention may be embodied in other specific forms without departing from the spirit or essential characteristics thereof. For example, while I have set forth exemplary designs for a fuel feed arrangement, many other embodiments are also feasible to attain the result of the principles of the apparatus and via use of the methods disclosed herein.

All the features disclosed in this specification (including any accompanying claims, the drawing, and the abstract) and/or any steps in the method or process so disclosed, may be combined in any combination, except combinations where at least some of the features and/or steps are mutually exclusive.

Each feature disclosed in this specification (including in the accompanying claims, the drawing, and the abstract), may be replaced by alternative features serving the same or similar purpose, unless expressly stated otherwise. Thus, unless expressly stated otherwise, each feature disclosed is one example only of a generic series of equivalent or similar features.

Therefore, it will be understood that the foregoing description of representative embodiments of the invention have been presented only for purposes of illustration and for providing an understanding of the invention, and it is not intended to be exhaustive or restrictive, or to limit the invention to the precise forms disclosed. On the contrary, the intention is to cover all modifications, equivalents, and alternatives falling within the spirit and scope of the invention as expressed in the appended claims. As, such, the claims are intended to cover the structures and methods described therein, and not only the equivalents or structural equivalents thereof, but also equivalent structures or methods. Thus, the scope of the invention, as indicated by the appended claims, is intended to include variations from the embodiments provided which are nevertheless described by the broad meaning and range properly afforded to the language of the claims, or to the equivalents thereof.

What is claimed is:

1. A method of generating power, comprising:
    (a) providing one or more ramjet thrust modules rotatably secured with respect to a circumferential wall;
    (b) supplying to each of said one or more ramjet thrust modules an airstream containing an oxidant and an oxidizable fuel;
    (c) oxidizing said fuel between said one or more ramjet thrust modules and said circumferential wall, to
        (i) generate combustion gases which escape therefrom, to
        (ii) generate a motive force by thrust reaction of said combustion gases escaping from between
            (A) each of said one or more ramjet thrust modules, and
            (B) at least a portion of said circumferential wall;
    (d) propelling said one or more ramjet thrust modules at an inlet velocity in excess of Mach 1.0 through said supplied airstream by way of said motive force, each of said one or more ramjet thrust modules relies on at least a portion of said circumferential wall to assist in compression of a portion of said supplied airstream as each of said one or more thrust modules passes adjacent thereto;

(e) providing one or more strakes, each of said one or more strakes located adjacent to one of said or more ramjets, and at least a portion of each of said one or more strakes extending outward from said rotor to a point adjacent said circumferential wall, said one or more strakes effectively separating said inlet air from said exhaust gases as said one or more ramjets compress inlet air and oxidize said fuel supplied thereto and generate exhaust gases therefrom and thus develop thrust to effect rotary motion of said rotor about said axis of rotation;

(f) turning an output shaft operatively connected to said one or more thrust modules;

(g) whereby power is provided at said output shaft.

2. The method as recited in claim 1 wherein the inlet velocity of said one or more thrust modules is at least Mach 2.0.

3. The method as recited in claim 2, wherein the inlet velocity of said one or more thrust modules is at least Mach 3.0.

4. The method as recited in claim 3, wherein the operational inlet velocity of said one or more thrust modules is between Mach 3.0 and Mach 4.5.

5. The method as recited in claim 3, wherein the operational inlet velocity of said one or more thrust modules is approximately Mach 3.5.

6. The method as recited in claim 1, wherein said fuel is selected from the group comprising gaseous hydrocarbon fuels.

7. The method as recited in claim 1, wherein said fuel is essentially natural gas.

8. The method as recited in claim 1, wherein the step of supplying fuel comprises injecting said fuel into a portion of said supplied airstream at a point prior to compression of said portion of said supplied airstream between said circumferential wall and any one of said one or more thrust modules.

9. The method as recited in claim 1, wherein said method of generating power further comprises the step of generating electricity.

10. The method of generating power as recited in claim 1, wherein said method further includes the step of recovering thermal energy from said combustion gases.

11. The method as recited in claim 10, wherein said thermal energy recovery step comprises transfer of said thermal energy from said combustion gases to a secondary working fluid.

12. The method as recited claim 11, further comprising the step directing said secondary working fluid to a turbine having a working shaft, and generating power by rotation of said turbine by said secondary working fluid, to produce shaft work from said turbine.

13. The method as recited in claim 12, further comprising the step of generating electricity from said shaft work of said turbine.

14. The method as recited in claim 1, wherein the step of providing an oxidant to said one or more thrust modules is provided by oxygen present in said supplied airstream, and wherein said supplied airstream is provided adjacent said circumferential wall, and wherein each of said one or more thrust modules are circumferentially spaced apart so as to engage said supplied airstream substantially free of turbulence from the previous passage through a given circumferential location of any one said one or more thrust modules.

15. The method as recited in claim 1, wherein said circumferential wall is stationary.

16. The method as set forth in claim 1, wherein said rotor further comprises a plurality of outer rim segments, at least some of which have at least one coolable wall, said at least one coolable wall comprising:

(a) an interior cool wall surface, (b) an outer hot wall surface, (c) a plurality of cooling passageways having outlets at said outer hot wall surface, (d) said method further comprising the step of supplying a cooling fluid behind said interior cool wall surface, and passing an amount of said cooling fluid outward through said cooling passageways to said outlets, in an amount sufficient to effect film cooling of said outer hot wall surface of said outer rim segments.

17. The apparatus as set forth in claim 16, wherein the step of supplying cooling fluid further comprises supplying an amount of cooling fluid to effect film cooling of said one or more strakes.

* * * * *

UNITED STATES PATENT AND TRADEMARK OFFICE
CERTIFICATE OF CORRECTION

PATENT NO.   : 6,298,653 B1  
DATED        : October 9, 2001  
INVENTOR(S)  : Shawn P. Lawlor It is certified that error appears in the above-identified patent and that said Letters Patent is hereby corrected as shown below:

Column 1,  
Line 57, after the words "electrical power", delete "al" and substitute therefore -- at --.  
Line 58, after the words "plant designs", delete "Which" and substitute therefore -- which --.

Column 2,  
Line 39, after the word "shaft.", delete "Tn" and substitute therefore -- In --.

Column 3,  
Line 30, after the word "prefer", delete "than" and substitute therefore -- that --.  
Line 52, delete "ieleasably" and substitute therefore -- releasably --.

Column 7,  
Line 55, after the words "rotor 120'", delete ", a" and substitute therefore -- . A --.  
Line 55, delete the words "a series" and substitute therefore -- A series --.

Column 9,  
Line 47, delete "136" and substitute therefore -- 138 --.  
Line 56, delete "136" and substitute therefore -- 138 --.

Column 10,  
Line 40, delete "110" and substitute therefore -- 120 --.  
Line 59, delete "he applied" and substitute therefore -- be applied --.  
Line 60, after the word "For", delete "startinq" and substitute therefore -- starting --.

Column 11,  
Line 52, after the word "achieving", delete "a".

Signed and Sealed this

Twenty-seventh Day of January, 2004

JON W. DUDAS  
*Acting Director of the United States Patent and Trademark Office*